US006692665B2

United States Patent
Shima et al.

(10) Patent No.: US 6,692,665 B2
(45) Date of Patent: Feb. 17, 2004

(54) LITHIUM MANAGANESE OXIDE, CATHODE MATERIAL FOR LITHIUM SECONDARY BATTERY, CATHODE, LITHIUM SECONDARY BATTERY AND PROCESS FOR MANUFACTURING LITHIUM MANGANESE OXIDE

(75) Inventors: Koji Shima, Kanagawa (JP); Akira Utsunomiya, Kanagawa (JP); Yasushi Tsurita, Kanagawa (JP)

(73) Assignee: Mitsubishi Chemical Corporation, Tokyo (JP)

( * ) Notice: Subject to any disclaimer, the term of this patent is extended or adjusted under 35 U.S.C. 154(b) by 239 days.

(21) Appl. No.: 09/843,865

(22) Filed: Apr. 30, 2001

(65) Prior Publication Data

US 2002/0009645 A1 Jan. 24, 2002

Related U.S. Application Data

(63) Continuation of application No. PCT/JP00/07704, filed on Nov. 1, 2000.

(30) Foreign Application Priority Data

Nov. 15, 1999 (JP) ........................ P. 11-323661

(51) Int. Cl.$^7$ .................. C01G 45/00; H01M 4/50; H01M 4/02; G01N 33/00

(52) U.S. Cl. ................. 252/518.1; 252/518.1; 252/519.15; 429/224; 429/231.95; 423/599; 423/49; 436/182

(58) Field of Search .............. 252/518.1, 519.15, 252/521.2; 429/224, 231.95; 423/599, 599.15, 607, 608, 624, 594.19, 594.17, 12, 49, 62, 67; 436/182

(56) References Cited

U.S. PATENT DOCUMENTS 5,766,800 A * 6/1998 Manev et al. ............ 429/224
6,190,800 B1 * 2/2001 Iltchev et al. ........... 429/224

FOREIGN PATENT DOCUMENTS

JP 6-275276 9/1994

(List continued on next page.)

OTHER PUBLICATIONS

Panasyuk, "Synthesis of Lithium–Manganese Oxide Spinel in Hydrothermal Conditions", High Pressure Research, 2001, Vol 2 pp. 39–43.*

(List continued on next page.)

*Primary Examiner*—Yogendra N. Gupta
*Assistant Examiner*—Kallambella Vijayakumar
(74) *Attorney, Agent, or Firm*—Oblon, Spivak, McClelland, Maier & Neustadt, P.C.

(57) ABSTRACT

The invention provides a lithium manganese oxide spinel suited as a cathode active material for lithium ion secondary batteries showing excellent high-temperature cycling behavior. The lithium manganese oxide is represented by the following general formula (1):

$$Li_{1+\alpha}Mn_{2-\alpha-y}M_yO_{4-\delta}$$

wherein $0 \leq \alpha \leq 0.5$, $0.005 \leq y \leq 0.5$, $-0.1 \leq \delta \div 0.1$, and M represents a metal element other than Li and Mn,
and which shows the ratio of a main peak intensity at 5±40 ppm to a main peak intensity at 525+40 ppm ($I_{0ppm}/I_{500ppm}$), each intensity being obtained by $^7$Li-NMR measurement according to the following measuring method, falling within the following range:

$$I_{0ppm}/I_{500ppm} \leq 0.65y + 0.02.$$

10 Claims, 6 Drawing Sheets

FOREIGN PATENT DOCUMENTS

| | | | | |
|---|---|---|---|---|
| JP | 7-245106 | 9/1995 | | |
| JP | 8-22826 | 1/1996 | | |
| JP | 9-251854 | 9/1997 | | |
| JP | 10-247497 | 9/1998 | | |
| JP | 10-316431 | * 12/1998 | ........... | C01G/51/00 |
| JP | 11-302020 | 11/1999 | | |
| JP | 11-354119 | * 12/1999 | ............ | H01M/4/58 |
| JP | 2000-243382 | 9/2000 | | |

OTHER PUBLICATIONS

Gee et all, "Electron Delocalization and Trasnsferred Hyperfine Fields at 7Li in Lithium Manganese Oxide based Spinels", ENC Conference Abstracts, 1998.*

Lee et al, "6–Li and 7–Li MAS NMR and in–situ X–Ray Diffraction Studies of Lithium Manganate Cathode Materials", MRS Sym Proc. 1999, vol. 548, pp. 197–202.*

* cited by examiner

LITHIUM MANAGANESE OXIDE, CATHODE MATERIAL FOR LITHIUM SECONDARY BATTERY, CATHODE, LITHIUM SECONDARY BATTERY AND PROCESS FOR MANUFACTURING LITHIUM MANGANESE OXIDE

FIELD OF THE INVENTION

This invention relates to a lithium manganese oxide spinel. More particularly, it relates to lithium manganese oxide suitable as a cathode active material of lithium ion secondary battery excellent in cycling behavior.

BACKGROUND OF THE INVENTION

Lithium ion secondary batteries, which work as a battery by charging or discharging lithium ion between a cathode and an anode, show a high operating voltage and a high energy density and can suitably find applications to cellular phones, portable personal computers, video cameras or electric cars.

As a cathode active material for lithium ion secondary batteries, a layered complex oxide of $Li_{1-x}CoO_z$ ($0 \leq x \leq 1$) have already been popularly put into practice since it can generate 4-V level high voltage and have a high energy density. On the other hand, the starting material of Co is a poor resource and expensive. Hence, in consideration of the possibility of a demand for lithium ion secondary battery being greatly increased, stable supply of the starting material is feared for and, further, its price might soar. Thus, it has been considered to utilize a complex oxide of unexpensive Mn as a cathode active material capable of substituting $Li_{j-x}CoO_2$.

Of manganese complex oxides, cubic lithium manganese oxide spinels have been variously investigated as cathode material of lithium secondary battery since M. M. Tackeray reported that Li ion can be occluded and discharged (Research Bulletin, Vol. 18, pp461 to 462 (1989)). The cubic lithium manganese oxide spinel is generally represented by the chemical formula of $LiMn_2O_4$, and have a spinel-type crystal structure. A lithium secondary battery using this complex oxide as a cathode active material undergoes change in composition between $LiMn_2O_4$ (discharged state) and $\lambda$-$MnO_2$(charged state) by Li intercalation and deintercalation. In addition to the cubic lithium manganese oxides, there exist tetragonal and orthorhombic lithium manganese oxides which are in a distorted form of the cubic system complex oxides.

However, in comparison with the aforesaid $Li_{1-x}CoO_2$, the lithium manganese oxides involve a serious problem of capacity deterioration when charging and discharging are repeatedly conducted at a temperature as high as 50 to 60° C. With respect to this problem, there have been proposed (1) to improve crystallinity of the lithium manganese oxide or (2) to substitute part of Mn by another metal element to stabilize crystal structure and depress capacity deterioration.

In particular, lithium manganese oxides partly substituted by another element according to the aforesaid technique (2) (hereinafter such lithium manganese complex oxide is sometimes referred to as "substituted lithium manganese oxide") show more stable crystal structure than the simple complex oxides (unsubstituted) comprising two of lithium and manganese and, as a result, can depress deterioration of capacity after repeated charging and discharging, thus the technique being extremely effective. However, with the increased demand for performance in recent years, such technique at present is still insufficient.

The present invention has been made with the situation in mind, and it provides a lithium manganese oxide suited for lithium secondary batteries, particularly substituted lithium manganese oxide. It also provides a lithium secondary battery showing excellent cycling behavior, and a cathode for use in the battery. It further provides a process for manufacturing the substituted lithium manganese oxide suited for lithium secondary batteries.

DISCLOSURE OF THE INVENTION

As a result of intensive investigations to attain the above-described objects, the inventors have found that substituted lithium manganese oxides acquire a structure slightly different from each other depending upon the processes for manufacturing them, as is different from the complex oxides simply comprising the two elements of lithium and manganese, and that the slight difference in structure leads to difference in performance. That is according to the findings of the inventors, the conventional common process of calcining starting materials comprising a lithium source and a maganese source in the air is not sufficient, and substituted lithium manganese oxides having excellent performance can be obtained by conducting calcination in two steps of calcination in an atmosphere of low oxygen concentration and calcination in an atmosphere of high oxygen concentration. The inventors have also found that such lithium manganese oxides providing good performance can be specified by $^7Li$-NMR, thus having completed the invention.

That is, the gist of the invention is a lithium manganese oxide spinel comprising lithium, manganese and a metal element other than lithium and manganese, which satisfies a composition condition of the following formula (A):

$$(x-1)+y+z=2 \tag{A}$$

wherein x, z and y respectively represent, in order, molar ratio of lithium, molar ratio of manganese and molar ratio of the other metal element, and x=1 to 1.5, y=0.005 to 0.5 and z=balance), and which shows the ratio to a main peak intensity at 5±40 ppm to a main peak intensity at525±40 ppm ($I_{0ppm}/I_{500ppm}$) each obtained by $^7Li$-NMR measurement according to the following measuring method, falling within the following formula (B):

$$I_{0ppm}/I_{500ppm} \leq 0.65y+0.02 \tag{B}$$

Measuring Method

A 4-mm Magic Angle Spinning (MAS) probe is utilized. $\pi$ pulse echo method is employed as a measuring pulse sequence.

Measuring conditions;
Resonance frequency; 155.43 MHz
Measuring range; 1 MHz
MAS spinning number; 15 kHz
Measuring temperature; 25° C.
Chemical shift reference; 0.1 M aqueous solution of LiCl (0 ppm)
Measuring pulse sequence; $\pi$ pulse echo method*1
Width of measuring pulse; 1 $\mu$s for 90, 2 $\mu$s for 180 degrees
Delay time $\pi$; 67 $\mu$s (reciprocal of mAS spinning number of 15 kHz)
Repeating period; 64 sec
*1: 90-degree pulse—waiting time $\pi$-180-degree ($\pi$) pulse—waiting time $\pi$—observation The thus obtained NMR spectrum is subjected to peak dividing in the following manner to obtain final peak strength. Peak-dividing conditions:
Fitting function; Lorentz type
Baseline correction; offset
Others; Fitting is conducted with the assumption that there is one main peak at each of 5±40 ppm and 525±40 ppm, treating others as side bands.

Additionally, as to the processes for manufacturing lithium manganese oxides, there are known literatures as follows.

Japanese Patent Laid-Open No. 245106/1995 discloses a process of manufacturing spinel structure of $Li_xMn_2O_4$ having a large specific surface area of 2 m$^2$/g or more by calcining $MnO_2$ and $LiNO_3$ in a nitrogen gas at a low temperature (about 500° C). It is described in this publication that use of crystalline spinel structure of $Li_xMn_2O_4$ having a large specific surface area serves to improve discharge capacity and cycling behavior at a high discharging rate.

In addition, it is proposed in Japanese Patent Laid-Open No. 247497/1998 to prepare a gel from a lithium salt, a manganese salt and a solution of polyvinyl butyral (chelating agent) and calcine the gel at 200 to 900° C for 5 to 30 hours under an inert gas or under air, thus producing $Li_xMn_2O_4$ to be used as a cathode active material for lithium secondary battery.

However, such prior art does not suggest the invention at all.

BEST MODE FOR PRACTICING THE INVENTION

Figure 1:
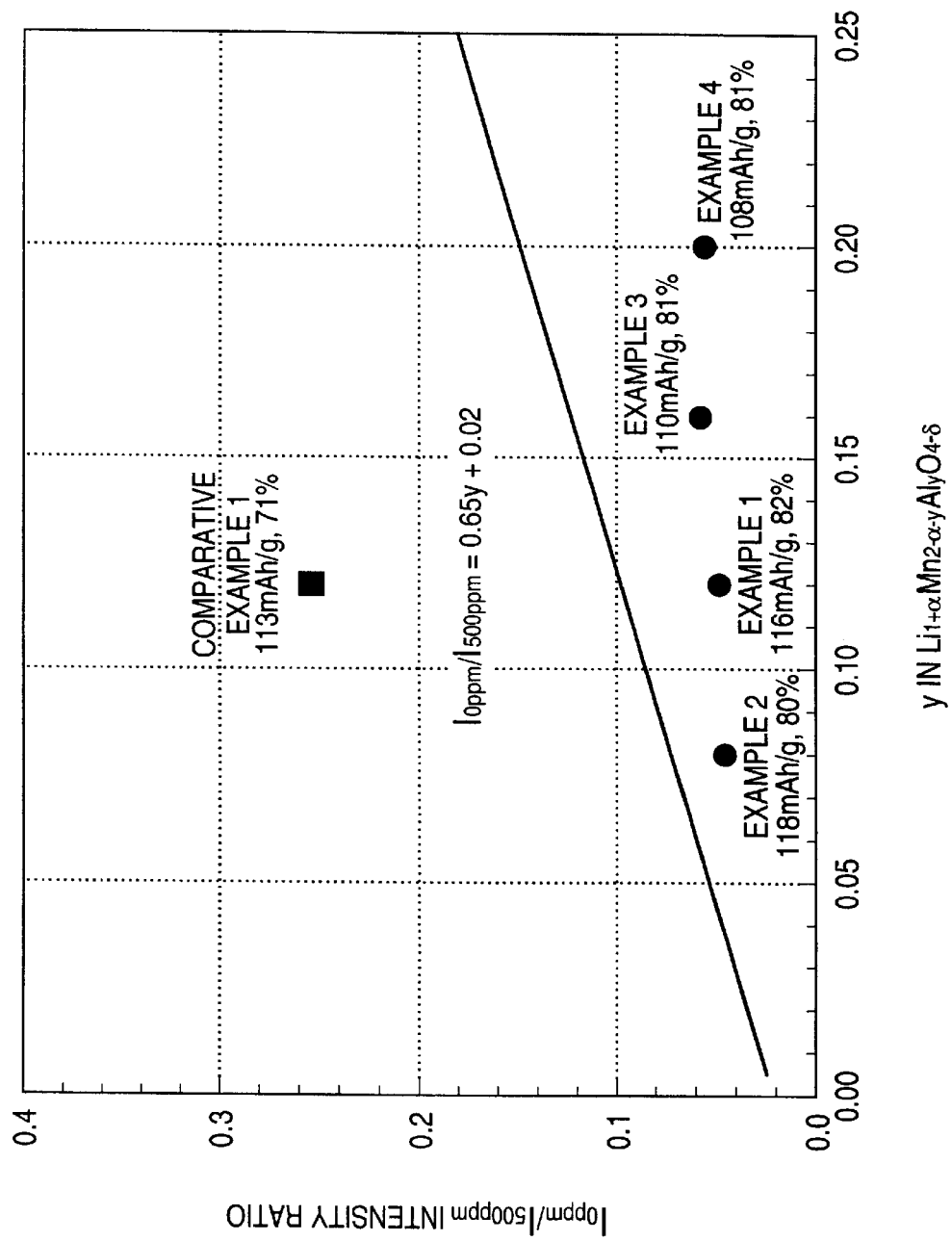
FIG. 1 is a graph showing the relation between the amount of substituting element, y, and the peak intensity ratio of $I_{0ppm}/I_{500ppm}$ in Examples 1 to 4 and Comparative Example 1.

The invention is now described in detail below.

The lithium manganese oxide of the invention is a lithium manganese oxide spinel comprising lithium, manganese and a metal element other than lithium and manganese, which satisfies the composition conditions as follows:

$$(x-1)+y+z=2 \text{ (i.e., } x+y+z=3) \tag{A}$$

x=1 to 1.5
y=0.005 to 0.5,
assuming that x, y and z respectively represent, in order, molar ratio of lithium, molar ratio of manganese and molar ratio of the other metal element.

Lithium manganese oxide spinels can be represented by $LiMn_2O_4$ in terms of the fundamental composition formula. Likewise, the lithium manganese oxide of the invention can be represented by the following general formula (1):

$$Li_{1+\alpha}Mn_{2-\alpha-y}M_yO_{4-\delta} \tag{1}$$

In the above general formula (1), $\alpha$ represents a number within the range of $0 \leq \alpha \leq 0.5$. $\alpha$ corresponds to the amount of lithium atom substituting at manganese sites, with (1+$\alpha$) corresponding to the amount of total lithium atom. $\alpha$ and x in the foregoing formula (A) are in the relation of $\alpha = x-1$. Too large $\alpha$ value causes a decrease in battery capacity and hence it is usually 0.4 or less, preferably 0.2 or less, more preferably 0.1 or less, most preferably 0.08 or less. However, complex oxides with too small $\alpha$ value are difficult to obtain and have a difficulty stabilized crystalline structure, thus the $\alpha$ value being usually 0.001 or more, preferably 0.01 or more.

In the above general formula (1), y is the same as defined with respect to formula (A), and is a number within the range of $0.005 \leq y \leq 0.5$. In general, y corresponds to the amount of the other metal element, M, substituting at manganese sites. Too large y value causes a serious decrease in battery capacity, and hence it is usually 0.4 or less, preferably 0.35 or less, more preferably 0.3 or less. However, complex oxides with too small y value undergo serious reduction in capacity by repeated charging and discharging, thus the y value being usually 0.01 or more, preferably 0.02 or more, more preferably 0.05 or more, most preferably 0.07 or more.

In the above general formula (1), $\delta$ is a number in the range of $-0.1 \leq \delta \leq 0.1$, preferably $-0.05 \leq \delta \leq 0.05$. $\delta$ corresponds to the deficient or excess amount of oxygen derived from the indefinite ratio in lithium manganese oxide in lithium manganese crystals.

In the above general formula, the other metal element M (in some cases referred to substituting element) represents a metal element other than lithium and manganese. As such other metal element M, there may be illustrated various metal elements such as Al, Fe, Ga, Bi, Sn, V, Cr, Co, Ni, Cu, Zn, Mg, Ti, Ge, Nb, Ta, Zr and Li. The substituting element M is preferably Al, Ti, V, Cr, Fe, Co, Ni, Cu, Zn, Mg, Ga or Zr, more preferably Al, Fe, Ga, Cr, Co, Mg or Ti. These substituting elements may be used in combination of two or more. OF these, aluminum is the most preferred element.

Average primary particle size of the lithium manganese oxide of the invention is usually 50 $\mu$m or less, preferably 10 $\mu$m or less, more preferably 5 $\mu$m or less, most preferably 4 $\mu$m or less, and is usually 0.01 $\mu$m or more, preferably 0.1 $\mu$m or more. If the primary size is too small, side reactions are liable to take place on the surface of the particles, leading to a decrease in cycling behavior whereas, if too large, rate capability or capacity is liable to decrease. The average primary particle size can be measured by observing under SEM. In addition, average secondary particle size of lithium manganese oxide is usually 100 $\mu$m or less, preferably 70 $\mu$m or less, more preferably 50 $\mu$m or less, most preferably 20 $\mu$m or less, and is usually 0.1 $\mu$m or more, preferably 0.3 $\mu$m or more, more preferably 0.5 $\mu$m or more, most preferably 1 $\mu$m or more. If the secondary particle size is too small, cycling behavior or safety is liable to be deteriorated whereas, if too large, internal resistance is liable to become too large to produce enough power output. The average secondary particle size can be measured by means of a particle size analyzer. Further, specific surface area of lithium manganese oxide measured by adsorption of nitrogen is usually 0.1 m$^2$/g or more, preferably 0.3 m$^2$/g or more, and is usually 5 m$^2$/g or less, preferably 3 m$^2$/g or less. If the specific surface area is too large, cycling behavior tends to be deteriorated due to side reactions at the surface of the particles whereas, if too small, rate capability or capacity is liable to decrease.

A characteristic feature of the invention lies in that the substituted lithium manganese oxide compound as described above shows a specific $^7$Li-NMR spectrum. Specifically, the substituted lithium manganese oxide shows the ratio of a main peak intensity at 5±40 ppm to a main peak intensity at 525±40 ppm ($I_{0ppm}/I_{500ppm}$), each intensity obtained by $^7$Li-NMR measurement, falling within the following formula:

$$I_{0ppm}/I_{500ppm} \leq 0.65y+0.02;$$

preferably $$I_{0ppm}/I_{500ppm} \leq 0.65y+0.01;$$

more preferably $$I_{0ppm}/I_{500ppm} \leq 0.65y$$

Measuring Method

A 4-mm Magic Angle Spinning (MAS) probe is utilized. A π pulse echo method is employed as a pulse sequence in this experiment.
Measuring conditions:
Resonance frequency; 155.43 MHz
Measuring range; 1 MHz
MAS spinning number; 15 kHz
Measuring temperature; 25° C.
Chemical shift reference; 0.1 M aqueous solution of LiCl (0 ppm)
Pulse sequence in this experiment; π pulse echo method*1
Width of measuring pulse; 1 μs for 90, 2 μs for 180 degrees
Delay time π; 67 μs (reciprocal of MAS spinning number of 15 kHz)
Repeating period; 64 sec
*1: 90-degree pulse-waiting time π-180-degree (π) pulse— waiting time π—observation The thus obtained NMR spectrum is subjected to peak dividing in the following manner to obtain final peak strength. Peak-dividing conditions:
Fitting function; Lorentz type
Baseline correction; offset
Others; Fitting is conducted with the assumption that there is one main peak at each of 5±40 ppm and 525±40 ppm, treating others as side bands.

Additionally, the peak intensity ratio $I_{0ppm}/I_{500ppm}$ is assumed to correspond to non-uniformity of substituting element M distribution in the crystal structure.

Substituted lithium manganese complex oxides having such a specific peak intensity ratio show excellent battery properties, particularly excellent cycling behavior at a high temperature when used as active materials of lithium secondary battery.

Substituted lithium manganese complex oxides having such a specific peak intensity ratio are difficult to be produced by the conventional process of merely calcining starting materials in the air, but can be easily produced by employing a specific calcining method. To be specific, the substituted lithium manganese complex oxides of the invention having the specific peak intensity ratio can be obtained by calcining a starting material mixture comprising a lithium source, a manganese source and a source of a metal other than lithium and manganese in an atmosphere of low oxygen concentration, then calcining in an atmosphere of high oxygen concentration.

In addition to the above-described calcining conditions, it is also of importance to select the condition under which substituting element M is well dispersed in the crystal in order to obtain the substituted lithium manganese oxides having the specific peak intensity ratio. For example, it is important to disperse as much as possible a substituting element source in the starting material to be calcined or to minimize the diameter of the starting material to be calcined. Specific process and conditions thereof will be described hereinafter.

As a lithium source to be used as a starting material, there can be used, for example, lithium hydroxide, inorganic lithium salts such as lithium carbonate, lithium nitrate and lithium halide and organic acid salts of lithium such as lithium acetate, and lithium oxalate. In addition, lithium oxide can be used as well. These may be hydrates or may be used in a state of being ionized. Preferable lithium sources are lithium carbonate and lithium hydroxide. A plurality of them may be used in combination as the lithium source.

As a manganese source which is another starting material, there may be used, for example, manganese oxides such as $MnO_2$, $Mn_2O_3$, $Mn_3O_4$ and MnO, manganese hydroxide, oxyhydroxide, inorganic manganese salts such as manganese nitrate and manganese carbonate and organic acid salts of manganese such as manganese acetate. These may be hydrates or may be used in a state of being isolated. Preferable manganese sources are manganese oxide and manganese oxyhydroxide. Manganese valence in the manganese source is preferably 3. A plurality of them may be used in combination as the manganese source.

The ratio of the lithium source to the manganese source in terms of Li/Mn molar ratio is preferably in the range of 0.4 to 0.6, more preferably 0.45 to 0.55.

As a substituting element source for allowing a source of the other metal element comprising metal element M (also referred to as "source of substituting element" to co-exist with the lithium source and the manganese source, there may be used oxides, hydroxides or oxyhydroxides, organic acid salts, or inorganic acid salts (e.g., chlorides, nitrates or sulfates) of substituting element M. These may be hydrates or may be used in a state of being isolated.

The molar ratio of Li/(Mn+substituting element M) in these starting materials is usually in the range of 0.4 to 0.6, preferably 0.45 to 0.55, more preferably 0.5 to 0.55. The molar ratio of Li/Mn/substituting element M in the starting material roughly determines the molar ratio of Li/Mn/substituting element M in the final lithium manganese oxide composite.

The starting materials are usually mixed before calcination. Mixing method is not particularly limited, and may be either wet mixing or dry mixing. For example, there may be illustrated a method of using an apparatus such as a ball mill, a vibration mill or a beads mill. Water-soluble starting materials such as lithium hydroxide may be mixed as an aqueous solution with other solid starting materials.

Wet mixing enables more uniform mixing, and permits easier control of the peak intensity ratio within the aforesaid range, thus being preferred. In wet mixing, it is more preferred to dissolve at least one of the lithium source, manganese source and the substituting element source in a medium such as water in the point of attaining more uniform mixing.

Mixing period is not described in a general manner, because it depends upon mixing methods. However, it suffices that the starting materials are uniformly mixed with each other to a particle level. For example, a ball mill (dry or wet) requires a mixing period of usually about 1 hour to about 2 days, and a beads mill (wet continuous method) requires a mixing period of usually about 0.1 to about 1 hour in terms of residence time.

In conducting wet mixing of the starting materials, the mixture is usually dried before calcination. As the drying method, spray drying is preferred. Since spray drying produces more uniformly mixed starting material, control of the peak intensity ratio within the aforesaid range can be attained with more ease.

The starting material mixture before calcination treatment is preferably prepared as powder having particle sizes as small as possible. Specifically, the particle size is usually 10 μm or less, preferably 2 μm or less, more preferably 1 μm or less, most preferably 0.5 μm or less. Thus, spherical degree of resulting lithium manganese oxide can be increased, and calcination time can be shortened. Further, the peak intensity ratio can be controlled within the aforesaid range with more ease. However, since too small particle size is industrially difficult to attain, the size is usually 0.01 μm or more, preferably 0.05 μm or more more preferably 0.1 μm or more.

Additionally, in preparing the starting material mixture by employing spray drying as described above, particle size of the starting material mixture before calcination can be controlled by controlling particle sizes of non-dissolved solid materials in the slurry to be subjected to spray drying. Therefore, average particle size of the non-dissolved solid material in the slurry to be subjected to spray drying should be usually 2 μm or less, preferably 1 μm or less, more preferably 0.5 μm or less and should be usually 0.01 μm or more, more preferably 0.05 μm or more, more preferably 0.1 μm or more.

In the calcination treatment of the starting material mixture, it is first calcined in an atmosphere of low oxygen concentration. The phrase "atmosphere of low oxygen concentration" as used herein means that content of oxygen in the gas phase in the vicinity of the starting material mixture upon calcination is 10 vol % to 0 vol %, preferably 5 vol % or less. Such atmosphere of low oxygen concentration can specifically be formed by introducing into a calcining furnace an inert gas such as nitrogen, argon or helium, steam, carbon monoxide or carbon dioxide as a gas or by providing in, or feeding into, a furnace a substance capable of generating the above-described gas (e.g., water or a carbonate) or a substance capable of reacting with oxygen such as carbon.

The starting material mixture calcined in the atmosphere of low oxygen concentration is then calcined in the atmosphere of high oxygen concentration. The phrase "atmosphere of high oxygen concentration" as used herein means that content of oxygen in the gas phase in the vicinity of the starting materials upon calcination is 15 vol % or more, preferably 20 vol % or more. Such atmosphere of high oxygen concentration can specifically be formed by introducing into a calcining furnace an air or oxygen or an oxygen-comprising mixed gas, or by providing in, or feeding into, a furnace a substance capable of generating oxygen (e.g., a nitrate).

Changing of the atmosphere from the atmosphere of low oxygen concentration to the atmosphere of high oxygen concentration can be conducted by, for example, a method of changing the kind of gas introduced into the furnace, a method of changing the content of oxygen in the introduced gas by means of PSA or a method of calcining first in a furnace of the atmosphere of low oxygen concentration then in a furnace of the atmosphere of high oxygen concentration.

Calcination may be conducted using, for example, a box furnace, a tube furnace, a tunnel furnace or a rotary kiln. Calcining temperature is usually 500° C. or higher, preferably 600° C. or higher, more preferably 800° C. or higher and is usually 1000° C. or lower, preferably 950° C. or lower, more preferably 920° C. or lower. If calcining temperature is too low, reaction rate of the starting material mixture becomes too slow, thus too low calcining temperature being not practical. On the other hand, too high temperature makes the lithium manganese oxide spinel unstable even in an oxygen-comprising atmosphere, thus not being preferred. Calcination may be conducted at a definite temperature or at varying temperatures.

In order to conduct calcination with more uniformity, it is desirable, upon raising temperature from room temperature to the calcining temperature, to gradually raise the temperature at a rate of, for example, 5° C. or less per minute, or to once stop raising temperature in the course of raising temperature and, after keeping the temperature for a while at the definite level, again raise temperature. In addition, it is preferred, after calcination, to gradually cool to room temperature at a rate of, for example 5° C. or less per minute.

Calcination time is usually selected from a wide range of 1 hour to 100 hours. Too short calcination time fails to provide complex oxides with a good crystallinity, whereas too long calcination time is not practical. Calcination time varies depending upon such conditions as particle size of the starting material mixture and calcining temperature and cannot be determined in a general manner. However, with a starting material having an average particle size of, for example, 1 μm, it is about 5 hours and, with a starting material mixture having an average particle size of 10 μm, it is about one day.

In the invention, it is preferred to obtain substances such as $Mn_3O_4$ and $LiMnO_2$ by calcination in the atmosphere of low oxygen concentration which are unstable under the conditions of the subsequent calcination in the atmosphere of high oxygen concentration. In other words, it is preferred in calcining treatment to form intermediates of unstable compounds such as $Mn_3O_4$ and $LiMnO_3$ which are unstable in the atmosphere of high oxygen concentration.

$Mn_3O_4$ and $LiMnO_2$ generate the lithium manganese oxide spinel in the atmosphere of high oxygen concentration, for example, according to the reaction as shown below.

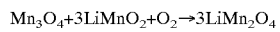
$$Mn_3O_4 + 3LiMnO_2 + O_2 \rightarrow 3LiMn_2O_4$$

The lithium manganese oxide spinel obtained via such unstable intermediate phase has a large primary particle size and is composed of secondary particles wherein the primary particles are tightly sintered to each other, thus being considered to have a lower specific surface area. In addition, the lithium manganese oxide spinel obtained via such unstable intermediate phase shows a good uniformity with respect to distribution of substituting element within crystal structure of the crystals and, as a result, is considered to exhibit excellent battery performance such as cycling behavior at elevated temperatures.

Electrodes and, further, batteries may be manufactured by using the thus obtained lithium manganese oxide as cathode material (active material). For example, one example of the battery is a lithium secondary battery having a cathode, an anode and an electrolyte. To be specific, there may be illustrated a secondary battery in which an electrolyte exists between a cathode and an anode and, if necessary, a separator is provided between the cathode and the anode to prevent them from contacting with each other.

The cathode contains the lithium manganese oxide (cathode material) obtained by the invention and a bindery. It may further contain, if necessary, a conductive matrix. The cathode may be obtained by mixing a mixture of the above-described materials with a definite amount of a solvent for uniformly dispersing them to thereby prepare a coating mixture, and then applying it onto a current collector, followed by drying. As the conductive matrix to be used here, there may be illustrated natural graphite, artificial graphite and acetylene black. As the binder, there may be illustrated polyvinylidene fluoride, polytetrafluoroethylene, polyvinyl acetate, polymethyl methacrylate, polyethylene and nitrocellulose. Further, as the dipersing solvent, there may be illustrated N-methylpyrrolidone, tetrahydrofuran and dimethylformamide. As the material of the current collector to be used for cathode, there may be illustrated aluminum and stainless steal, with aluminum being preferred. The cathode is usually press-integrated by roller pressing or other technique after formation of the cathode mixture layer on the current collector.

On the other hand, as the anode, those which are obtained by coating a carbonaceous material such as natural graphite or pyrolitic carbon on the current collector such as Cu, or a lithium metal foil or a lithium-aluminum alloy may be used. Preferably, the carbonaceous materials are used.

The electrolyte to be used in lithium secondary batteries is usually a non-aqueous electrolytic solution, and is prepared by dissolving an electrolytic salt in the non-aqueous solvent. As the electrolytic salts, there are illustrated lithium salts such as $LiClO_4$, $LiAsF_6$, $LiPF_6$, $LiBF_4$, LiBr and $LiCF_3SO_3$. As the non-aqueous solvent, there are illustrated tetrahydrofuran, 1,4-dioxane, dimethylformamide, acetonitrile, benzonitrile, dimethyl carbonate, diethyl carbonate, methyl ethyl carbonate, ethylene carbonate, propylene carbonate and butylene carbonate. These electrolytic salts or non-aqueous solvents may be used independently or as a mixture of two or more.

The electrolyte may be the above-described electrolytic solution or may be various conventionally known solid or gel electrolytes.

As the separator to be used in the lithium secondary battery, there may be illustrated unwoven fabric filter of a high polymer such as Teflon, polyethylene, polypropylene or polyester or of glass fibers, or a composite unwoven filter of glass fibers and polymer fibers.

EXAMPLES

The invention is described in more detail by reference to Examples which, however, do not limit the invention, and modification can be made within the spirit of the invention.

Example 1

Preparation of Lithium Manganese Oxide $Mr_2O_3$ and AlOOH were weighed in such amounts that molar ratio of Mn:Al became 1.88:012. To 100 parts by weight of this starting powder mixture were added 233 parts by weight of pure water and 2 parts by weight of an ammonium polycarboxylate dispersing agent, and then the resulting mixture was wet pulverized and mixed in a beads mill to obtain a slurry. Particle size distribution of the mixture of $Mn_2O_3$ and AlOOH dispersed in the slurry was measured using a laser diffraction/scattering type particle size analyzer; LA-910 produced by HORIBA, LTD. and, as a result, average particle size was measured to be 0.48 μm, and 90% sieve-pass particle size was found to be 0.65 μm.

$LiOH.H_2O$ was added to this slurry and dissolved therein to prepare a starting slurry having a molar ratio of Li:Nn:Al of 1.04:1.88:0.12 (x=1.026, y=0.118, z=1.855). This slurry was spray dried through a two-fluid nozzle to obtain starting particles having an almost spherical shape.

5 g of the starting particles were charged in an alumina-made crucible having a diameter of 50 mm, placed in a small-sized gas-flow furnace and, after introducing thereinto nitrogen to decrease oxygen concentration in an exhaust gas from the furnace to 0.1% or less, the temperature was raised up to 900° C. at a rate of 5° C./min. in a nitrogen stream. 3 hours after the point at which temperature inside the furnace reached 900° C., the introduced gas was changed from nitrogen to air and the temperature was kept at the level for 2 hours, followed by cooling to room temperature at a rate of 1° C./min. to obtain almost spherical particles having an average particle size (average secondary particle size) of 8 μm.

The particles were confirmed to be lithium manganese oxide spinel through the powder X-ray diffraction pattern. Specific surface area of the particles was measured to be 0.95 $m^2/g$ (in terms of BET specific surface area through adsorption of nitrogen using AMS-1000 made by Ohkurariken Co, Ltd.).

Measurement of $^7Li$-NMR

The thus obtained lithium manganese oxide was subjected to measurement of $^7Li$-NMR to determine the ratio of an intensity of main peak appearing at 5±40 ppm to an intensity of main peak appearing at 525±40 ppm ($I_{0ppm}/I_{500ppm}$). Apparatus used: Solid NMR apparatus, Chemagnetics Infinity 400, made by Varian, Inc.

Measuring method:

A 4 mm Magnetic Angle Spinning (MAS) probe was utilized in order to obtain high speed spinning. In addition, observation range was so wide that a n-pulse echo method was used as a pulse sequence in this experiment. Measuring conditions are shown below.

Figure 2:
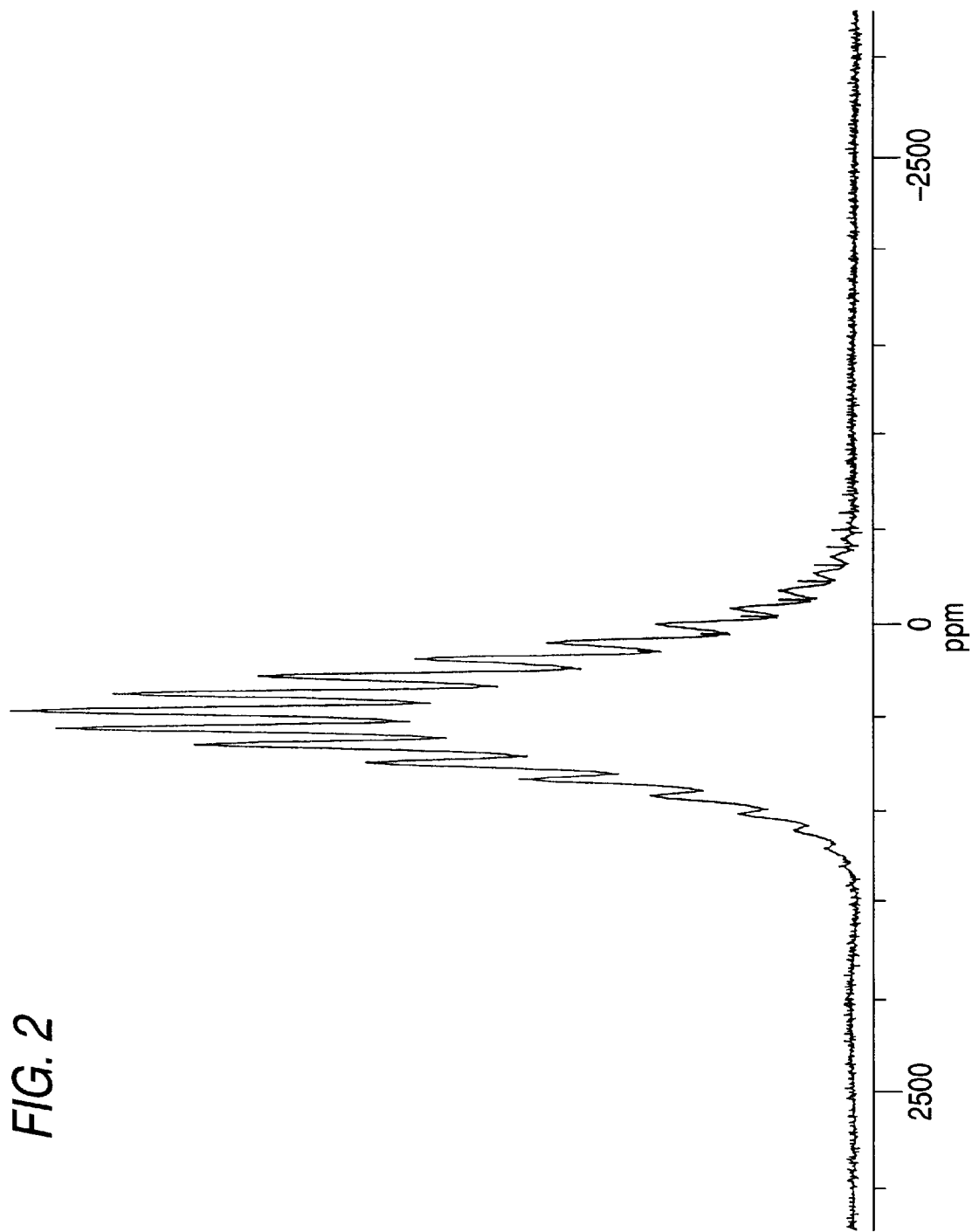
FIGS. 2 to 6 are $^7$Li-NMR spectra of the lithium manganese oxides respectively used in Examples 1 to 4 and Comparative Example 1.

Measuring conditions:
Resonance frequency; 155.43 MHz
Measuring range; 1 MHz
MAS spinning number; 15 kHz
Measuring temperature; 25° C.
Chemical shift reference; 0.1 M aqueous solution of LiCl (0 ppm)
Pulse sequence in this experiment, π pulse echo method*1
Width of measuring pulse; 1 μs for 90, 2 μs for 180 degrees
Delay time π; 67 μs reciprocal of MAS spinning number of 15 kHz)
Repeating period; 64 sec
*1:90-degree pulse—waiting time π—180-degree (π) pulse—waiting time π—observation The thus obtained NMR spectrum is shown in FIG. 2.

Analyzing method:

In the thus obtained NMR spectrum, side hands by MAS overlap on the main peaks and hence intensity of the peak cannot directly be determined. Thus, peak division was conducted with the main peak and side bands under the following conditions to finally obtain the peak intensity.

Peak-dividing conditions;
Fitting function; Lorentz type
Baseline correction; offset
Others; Fitting is conducted with the assumption that there is one main peak at each of 5±40 ppm and 525±40 ppm, treating others as side bands.

As a result of the analysis, there were determined an intensity of main peak appearing at 5±40 ppm, $I_{0ppm}$, and an intensity of main peak appearing at 525±40 ppm, $I_{500ppm}$, the ratio of $I_{0ppm}$ to $I_{500ppm}$ ($I_{0ppm}/I_{500ppm}$) being shown in Table 1. In addition, FIG. 1 shows the relation between y value of the obtained lithium manganese oxide of $Li_{1+\alpha}Mn_{2-\alpha-y}M_yO_{4-\delta}$ and the peak intensity ratio of $I_{0ppm}/I_{500ppm}$.

Evaluation of Battery Performance 75 parts by weight of lithium manganese oxide, 20 parts by weight of acetylene black as a conducting matrix and 5 parts by weight of polytetrafluoroethylene as a binder were mixed with each other, and formed into a cathode pellet. A coin-type battery was prepared using the cathode pellet. That is, lithium metal was used as an anode material and, as an electrolytic solution, a solution prepared by dissolving 1 mol/L of lithium hexafluorophosphate ($LiPF_6$) in a solution of a mixed solvent of 3:7 by volume of ethylene carbonate and diethyl carbonate was used. A discharge capacity per unit weight of the cathode material upon charging and discharging at a current density of 0.5 $mA/cm^2$ at 25 C was measured using this battery, and was taken as an initial discharging capacity.

In addition, a coin-type battery was prepared in the same manner as in the case of reassuring the initial discharging capacity except for using carbon as an anode active material, and a ratio of capacity of 100th cycle upon charging and discharging at a current value of 1 C at 50° C. to capacity of first cycle (%) was determined, which was taken as a capacity-retaining ratio.

The results thus obtained are tabulated in Table 1.

Example 2

Figure 3:
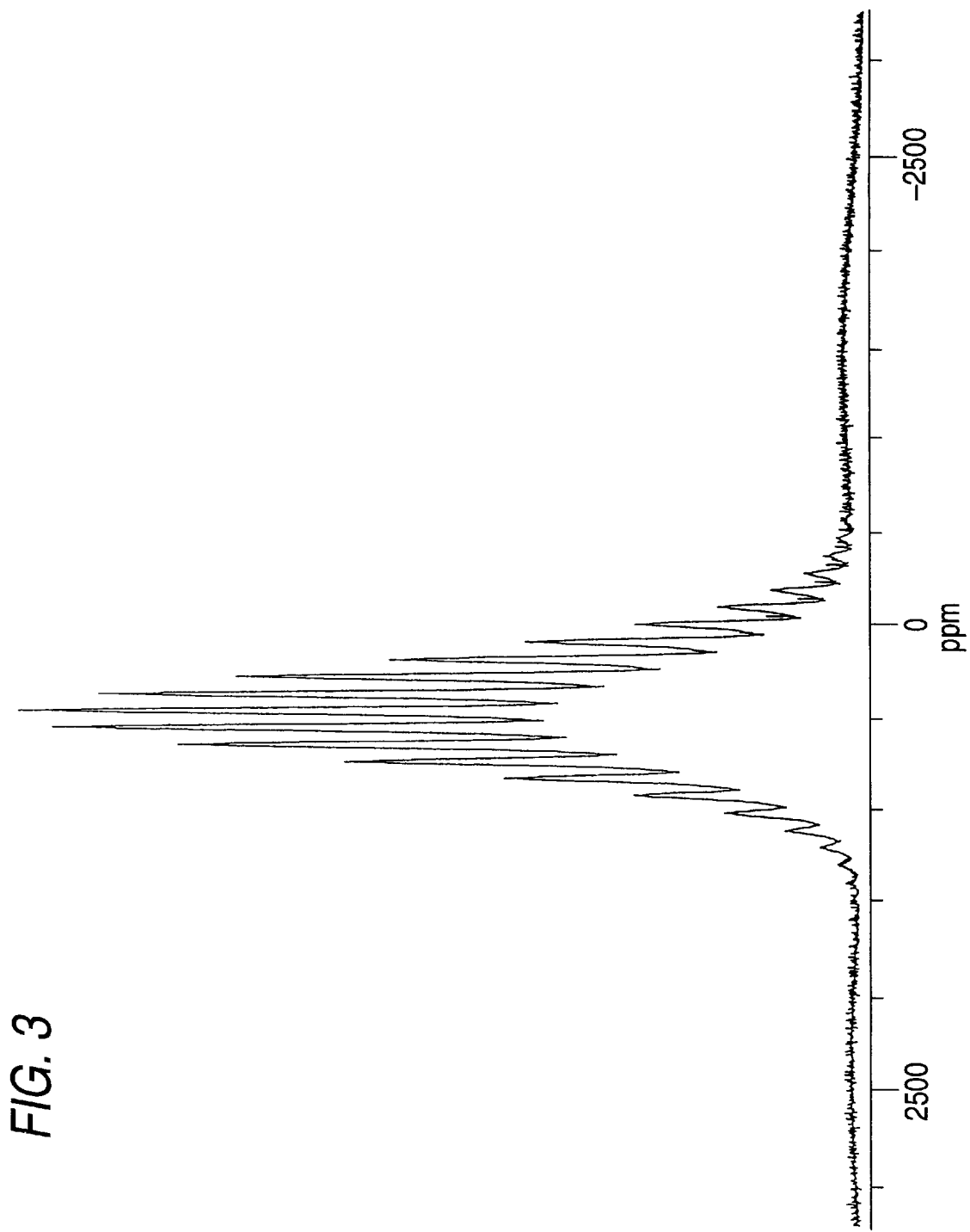

Lithium manganese oxide was prepared and evaluated in the same manner as in Example 1 except for changing the molar ratio of Li:Mn:Al to 1.04:1.92:0.08. Results are shown in FIGS. 1 and 3 and Table 1.

Example 3

Figure 4:
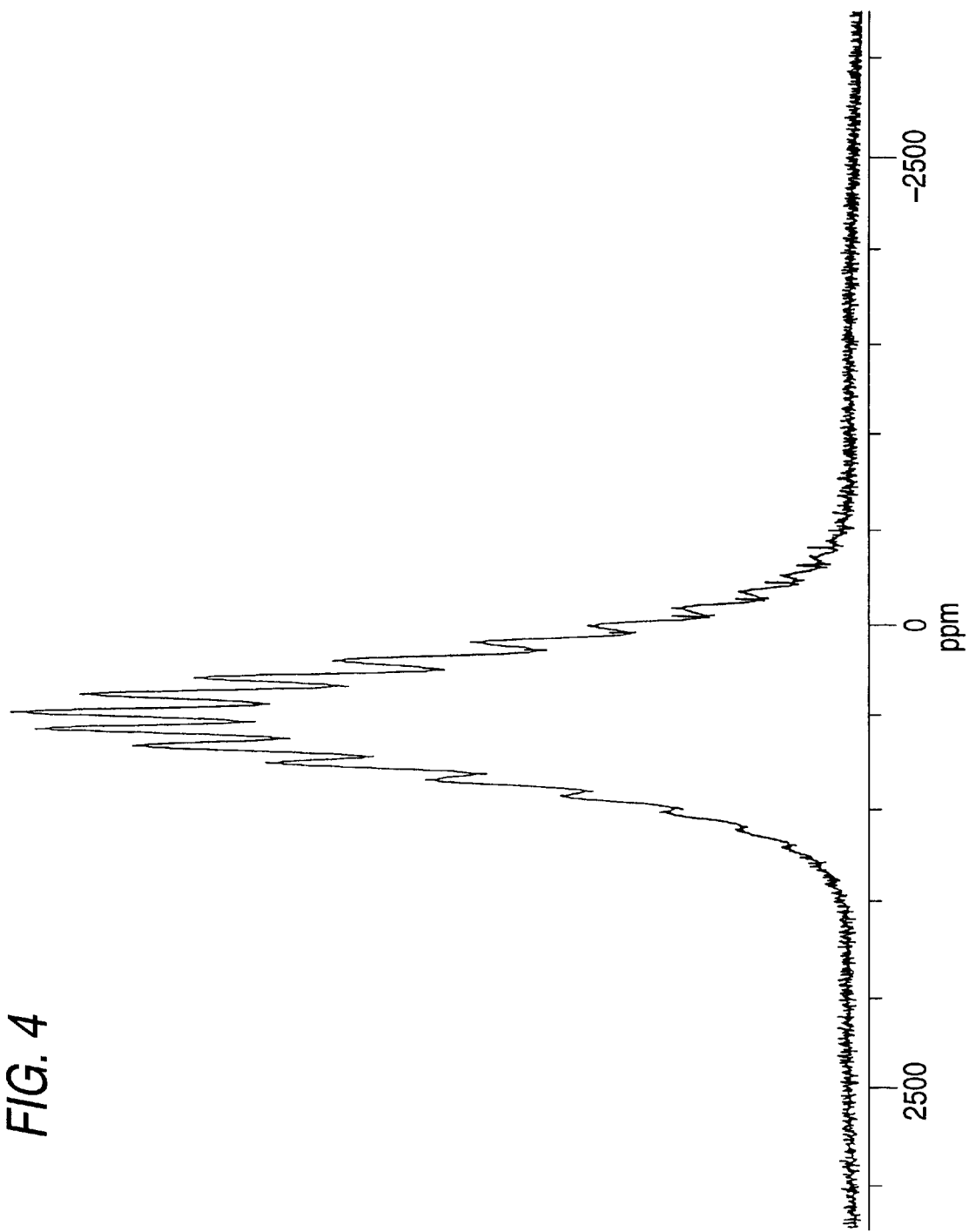

Lithium manganese oxide was prepared and evaluated in the same manner as in Example 1 except for changing the molar ratio of Li:Mn:Al to 1.04:1.84:0.16. Results are shown in FIGS. 1 and 4 and Table 1.

Example 4

Figure 5:
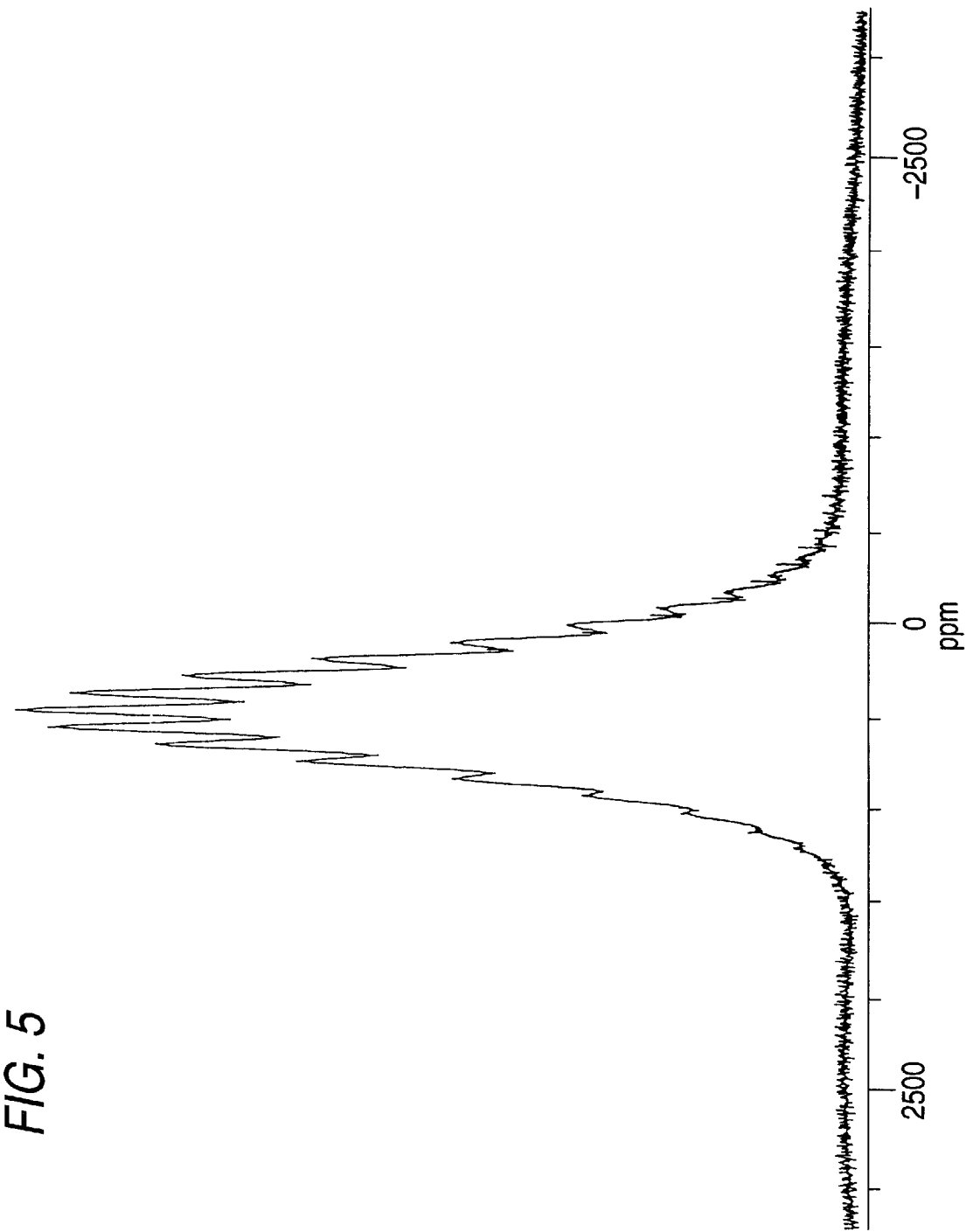

Lithium manganese oxide was prepared and evaluated in the same manner as in Example 1 except for changing the molar ratio of Li:Mn:Al to 1.04:1.80:0.20. Results are shown in FIGS. 1 and 5 and Table 1.

Comparative Example 1

Figure 6:
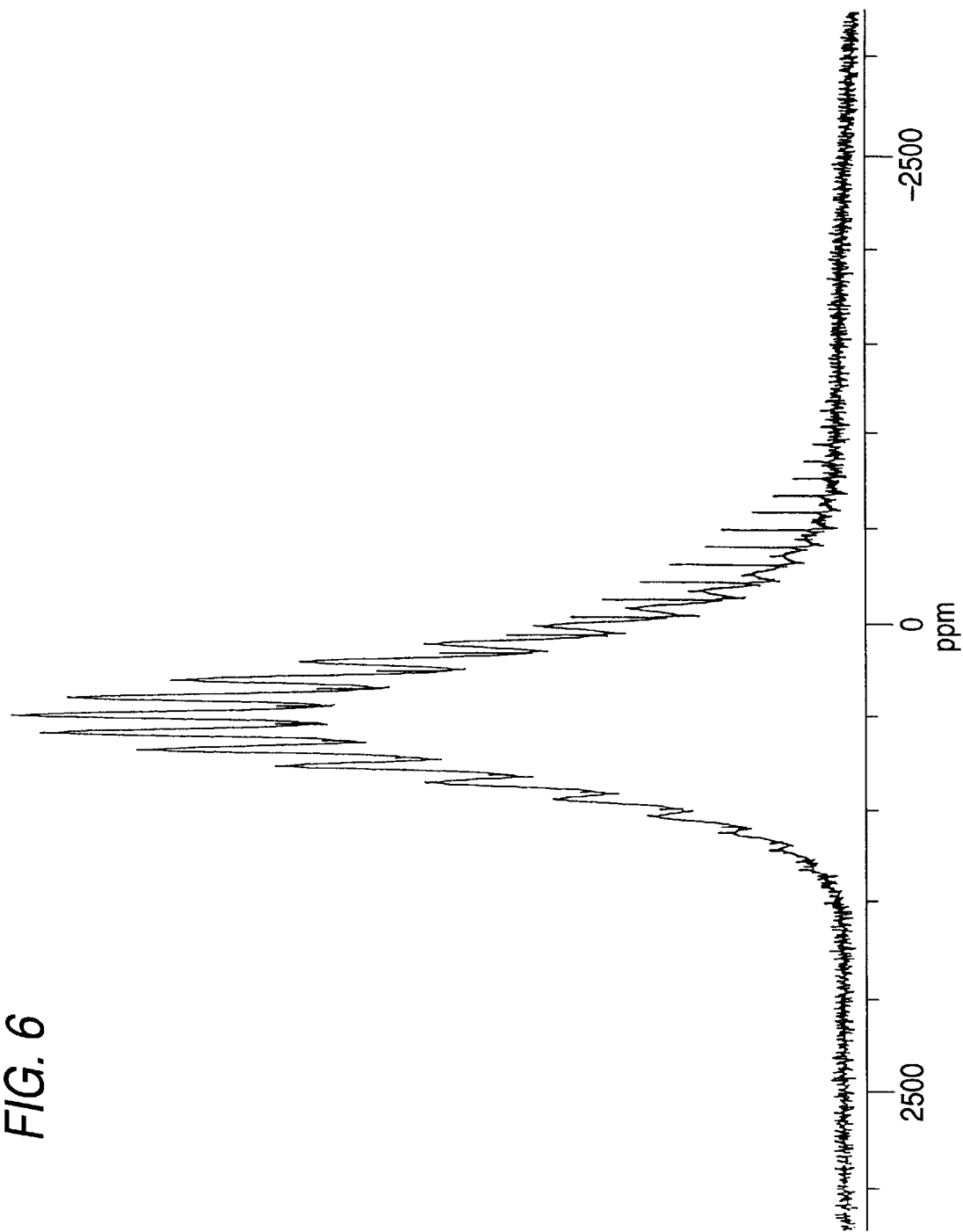

Lithium manganese oxide was prepared and evaluated in the same manner as in Example 1 except for conducting all calcination in an atmosphere. Results are shown in FIGS. 1 and 6 and Table 1.

Comparative Example 2

Lithium manganese oxide was prepared and evaluated in the same manner as in Example 1 except for not adding AlOOH, changing the molar ratio of Li:Mn to 1.04:2.00 and conducting the calcination at 850° C. Results are shown in FIG. 1 and Table 1

Comparative Example 3

Lithium manganese oxide was prepared and evaluated in the same manner as in Comparative Example 1 except for conducting all calcination in an atmosphere. Results are shown in FIG. 1 and Table 1.

It is seen from FIG. 1 and Table 1 that good capacity-retaining ratios can be obtained when the specific peak intensity ratio of $I_{0ppm}/I_{500ppm}$ falls within a range of $I_{0ppm}/I_{500ppm} \leq 0.65y+0.02$ (Examples 1 to 4 and Comparative Example 1). Mere calcination in the air as in the conventional art fails to provide a peak intensity ratio of the specific range, resulting in decreased capacity-retaining ratio (Comparative Example 1). Further, in the absence of aluminum (substituting element M), even the two-step calcination wherein calcination in the atmosphere of high oxygen concentration is conducted after calcination in the atmosphere of low oxygen concentration generates no difference in performance in comparison with the conventional one-step calcination (Comparative Examples 2 and 3).

Example 5

$Mn_2O_3$ and AlOOH were weighed in such amounts that molar ratio of Mn.Al became 1.88:0.12. To 100 parts by weight of this starting powder mixture were added 233 parts by weight of pure water and 2 parts by weight of an ammonium polycarboxylate dispersing agent, and then the resulting mixture was wet pulverized and mixed in a beads mill to obtain a slurry comprising solids of 0.5 $\mu$m in average particle size. $LiOH \cdot H_2O$ was added to this slurry and dissolved therein to prepare a slurry having a molar ratio of Li:Mn:Al of 1.04:1.88:0.12. This slurry was spray dried to obtain particles having an almost spherical shape and an average particle size (average secondary particle size) of 8 $\mu$m.

The particles were placed in a small-sized gas-flow furnace and retained at 900° C. for 26 hours in a nitrogen stream. Oxygen concentration in the exhaust gas from the furnace was 0.1% or less. After 26 hours, the introduced gas was changed from nitrogen to air, and the temperature was decreased to room temperature at a rate of 0.2° C./min.

The particles were confirmed to be spinel-structure lithium manganese oxide through measurement of the powder X-ray diffraction pattern. Observation of the particles under a scanning electron microscope revealed that average primary particle size thereof was about 3 $\mu$m. Specific surface area of the particles was measured to be 0.6 $M^2$/g by adsorption of nitrogen.

TABLE 1

| | Al Substitution amount (y) | Calcination Conditions | Peak Intensity Ratio | Specific Surface Area ($m^2$/g) | Initial Discharging Capacity (mAh/g) | Capacity Retaining Ratio (%) |
|---|---|---|---|---|---|---|
| Example 1 | 0.12 | 900° C. nitrogen → air | 0.0490 | 0.95 | 116 | 82 |
| Example 2 | 0.08 | 900° C. nitrogen → air | 0.0454 | 0.88 | 118 | 80 |
| Example 3 | 0.16 | 900° C. nitrogen → air | 0.0580 | 1.05 | 110 | 81 |
| Example 4 | 0.20 | 900° C. nitrogen → air | 0.0571 | 1.16 | 108 | 81 |
| Comparative Example 1 | 0.12 | 900° C. air | 0.2534 | 1.87 | 113 | 71 |
| Comparative Example 2 | 0.00 | 850° C. nitrogen → air | — | — | 121 | 59 |
| Comparative Example 3 | 0.00 | 850° C. air | — | — | 127 | 65 |

75 parts by weight of the thus obtained lithium manganese oxide, 20 parts by weight of acetylene black as a conducting agent and 5 parts by weight of polytetrafluoroethylene as a binder were mixed with each other, and formed into a cathode pellet. A coin-type battery was prepared using the cathode pellet. Lithium metal was used as an anode material and, as an electrolytic solution, a solution prepared by dissolving 1 mol/l of lithium hexafluorophosphate (LiPF$_6$) in a solution of a mixed solvent of 3:7 by volume of ethylene carbonate and diethyl carbonate. A discharge capacity per unit weight of the cathode material upon charging and discharging at a current density of 1 mA/cm$^2$ at 25° C. was measured to be 109 mAh/g using this battery.

In addition, a coin-type battery was prepared in the same manner as described above except for using carbon as an anode material, and a ratio of capacity retention of first chrge-discharge cycle at a current value of 1 C at 50° C. to capacity after 100th cycles was determined to be 77%.

Example 6

Lithium manganese oxide was obtained in the same manner as in Example 5 except for changing the retention time at 900° C. in a nitrogen stream to 5 hours, changing the introduced gas from nitrogen to air upon completion of retention at 900° C., and cooling at a rate of 1° C./min.

The resulting particles had an average primary particle size of about 2 μm and a specific surface area of 0.8 m$^2$/g. Discharge capacity and capacity-retaining ratio measured in the same manner as in Example 5 were 112 mAh/g and 79%, respectively.

Example 7

Lithium manganese oxide was obtained in the same manner as in Example 6 except for using a mixed gas of nitrogen and air in place of nitrogen and changing the oxygen concentration in the exhaust gas to 1%.

The resulting particles had an average primary particle size of about 1 μm. Discharge capacity and capacity-retaining ratio measured in the same manner as in Example 5 were 112 mAh,/g and 79%, respectively.

Example 8

Lithium manganese oxide was obtained in the same manner as in Example 6 except for using a mixed gas of nitrogen and air in place of nitrogen and changing the oxygen concentration in the exhaust gas to 2%.

The resulting particles had an average primary particle size of about 1 μm and a specific surface area of 1.0 m$^2$/g. Discharge capacity and capacity-retaining ratio measured in the same manner as in Example 5 were 113 MAh/g and 77%, respectively.

Example 9

Lithium manganese oxide was obtained in the sane manner as in Example 6 except for using a mixed gas of nitrogen and air in place of nitrogen and changing the oxygen concentration in the exhaust gas to 5%.

The resulting particles had an average primary particle size of about 0.5 μm and a specific surface area of 1.3 m$^2$/g. Discharge capacity and capacity-retaining ratio measured in the same manner as in Example 5 were 113 mAh/g and 74%, respectively.

Example 10

Lithium manganese oxide was obtained in the same manner as in Example 6 except for changing the calcination temperature in a nitrogen atmosphere to 850 C and changing the introduced gas from nitrogen to air upon completion of retention at 850° C.

The resulting particles had an average primary particle size of about 1 μm and a specific surface area of 1.3 m$^2$/g. Discharge capacity and capacity-retaining ratio measured in the same manner as in Example 5 were 113 mAh/g and 77%, respectively.

Example 11

Lithium manganese oxide was obtained in the same manner as in Example 6 except for using steam in place of nitrogen.

The resulting particles had an average primary particle size of about 1 μm and a specific surface area of 0.9 m$^2$/g. Discharge capacity and capacity-retaining ratio measured in the same manner as in Example 5 were 113 mAh/g and 75%, respectively.

Comparative Example 4

Spinel-structure Lithium manganese oxide was obtained in the same manner as in Example 6 except for conducting calcination introducing air from the first.

The resulting particles had an average primary particle size of about 0.5 μm and a specific surface area of 1.8 m$^2$/g Discharge capacity and capacity-retaining ratio measured in the same manner as in Example 5 were 112 mAh/g and 71%, respectively.

Reference Example 1

Spray dried particles of the starting mixture slurry obtained in the same manner as in Example 5 were retained at 900 C for 1 hour in a nitrogen stream, then cooled to room temperature in 30 minutes in the same stream. Measurement of powder X-ray diffraction pattern of the particles revealed that the product was a mixture of LiMnO$_2$ and Mn$_3$O$_4$.

Reference Example 2

Spray dried particles of the starting mixture slurry obtained in the same manner as in Example 5 were retained at 650° C. for 1 hour in a nitrogen stream, then cooled to room temperature in 30 minutes in the same stream. Measurement of powder X-ray diffraction pattern of the particles revealed that the product was a mixture of LiMnO$_2$, Mn$_3$O$_4$ and LiMnO$_3$.

Reference Example 3

Spray dried particles of the starting mixture slurry obtained in the same manner as in Example 5 were retained at 650° C. for 1 hour in an air stream, then cooled to room temperature in 30 minutes in the same stream. Measurement of powder X-ray diffraction pattern of the particles revealed that the product was single phase LiMn$_2$O$_4$.

INDUSTRIAL APPLICABILITY

The invention enables one to obtain lithium manganese oxide having excellent properties as a cathode material for a lithium secondary battery. In particular, the invention can provide lithium manganese oxide to be used for lithium secondary batteries showing excellent capacity, rate capability, safety and productivity. Further, the invention provides a lithium secondary battery particularly excellent in cycling behavior at an elevated temperature and lithium manganese oxide for use in the battery.

In addition, in case when used as a cathode active material for a lithium ion secondary battery, the spinel-structure lithium manganese oxide obtained according to the manufacturing process of the invention by calcining a starting mixture first in an atmosphere of low oxygen concentration, then in an atmosphere of high oxygen concentration provides a high capacity-retaining ratio at an elevated temperature and an excellent cycling behavior at an elevated temperature.

What is claimed is:

1. A lithium manganese oxide spinel, comprising:

lithium, manganese and a metal element other than lithium and manganese;

wherein said lithium manganese oxide spinel satisfies formula (A):

$$(x-1)+y+z=2 \qquad (A);$$

wherein x, z and y represent molar ratios of lithium, manganese and said metal element other than lithium and manganese, respectively;

wherein
x=1 to 1.5,
y=0.005 to 0.5, and
z is a balance;

wherein said lithium manganese oxide spinel has a ratio ($I_{0ppm}/I_{500ppm}$) of a main peak intensity at 5±40 ppm to a main peak intensity at 525±40 ppm which falls within formula (B):

$$I_{0ppm}/I_{500ppm} \leq 0.65y+0.02 \qquad (B);$$

wherein each main peak intensity is obtained from an NMR spectrum measured by $^7$Li-NMR measurement using a 4-mm Magic Angle Spinning (MAS) probe;

wherein a π pulse echo method is employed as a pulse sequence;

wherein said $^7$Li-NMR measurement proceeds at a resonance frequency of 155.43 MHz; a measuring range of 1 MHz; at a MAS spinning number of 15 kHz; at a measuring temperature of 25° C.; using a 0.1 M aqueous solution of LiCl as a chemical shift reference for 0 ppm;

wherein said π pulse echo method comprises a 90-degree pulse, a waiting time π, a 180-degree (π) pulse, a waiting time π and an observation;

wherein a measuring pulse in said pulse echo method has a width of 1 μs for 90 degrees, and of 2 μs for 180 degrees; a delay time π of 67 μs which is a reciprocal of said MAS spinning number of 15 kHz; and a repeating period of 64 sec;

wherein said NMR spectrum is subjected to peak dividing using a Lorentz fitting function; and an offset baseline correction;

wherein fitting of said NMR spectrum is conducted with the assumption that there is one main peak at each of 5±40 ppm and 525±40 ppm, treating other bands as side bands, to obtain said main peak intensity.

2. The lithium manganese oxide according to claim 1, which is represented by formula (1):

$$Li_{1+\alpha}Mn_{2-\alpha-y}M_yO_{4-\delta} \qquad (1);$$

wherein
$0 \leq \alpha \leq 0.5$,
$0.005 \leq y \leq 0.5$,
$-0.1 \leq \delta \leq 0.1$, and
M represents said metal element other than Li and Mn.

3. The lithium manganese oxide according to claim 1, which has a specific surface area of 0.3 to 3 m$^2$/g.

4. The lithium manganese oxide according to claim 1, wherein the metal element other than Li and Mn is at least one element selected from the group consisting of Al, Fe, Ga, Bi, Sn, V, Cr, Co, Ni, Cu, Zn, Mg, Ti, Ge, Nb, Ta and Zr.

5. The lithium manganese oxide according to claim 4, wherein the metal element other than Li and Mn is Al.

6. A cathode material, comprising:
said lithium manganese oxide according to claim 1.

7. A cathode for use in a lithium secondary battery, comprising:
said cathode material according to claim 6; and
a binder.

8. A lithium secondary battery, comprising:
a cathode comprising said lithium manganese oxide according to claim 1; and
an anode.

9. The lithium secondary battery according to claim 8, wherein said anode comprises a carbonaceous material.

10. A process for manufacturing lithium manganese oxide spinel, which comprises: calcining a starting material comprising a lithium source, a manganese source and a source of an element other than lithium and manganese in an atmosphere of low oxygen concentration; and then calcining in an atmosphere of high oxygen concentration.

\* \* \* \* \*

UNITED STATES PATENT AND TRADEMARK OFFICE
CERTIFICATE OF CORRECTION

PATENT NO.    : 6,692,665 B2
DATED         : February 17, 2004
INVENTOR(S)   : Shima et al.

It is certified that error appears in the above-identified patent and that said Letters Patent is hereby corrected as shown below:

<u>Title page, Item [54] and Column 1, lines 1-6,</u>
Title, should read:
-- LITHIUM MANGANESE OXIDE, CATHODE MATERIAL FOR LITHIUM SECONDARY BATTERY, CATHODE, LITHIUM SECONDARY BATTERY AND PROCESS FOR MANUFACTURING LITHIUM MANGANESE OXIDE --

Signed and Sealed this

Fourth Day of May, 2004

JON W. DUDAS
*Acting Director of the United States Patent and Trademark Office*